Dec. 22, 1970 KAZUNORI SHIZU 3,550,038

DEFLECTION YOKE ASSEMBLY FOR TELEVISION PICTURE

Filed Feb. 12, 1969 4 Sheets-Sheet 1

INVENTOR
KAZUNORI SHIZU
BY Mc Glew & Toren
ATTORNEYS

INVENTOR
KAZUNORI SHIZU
BY McGlew & Toren
ATTORNEYS

INVENTOR
KAZUNORI SHIZU
BY McGlew & Toren
ATTORNEYS

INVENTOR
KAZUNORI SHIZU
BY McGlew & Toren
ATTORNEYS

United States Patent Office 3,550,038

Patented Dec. 22, 1970

3,550,038
DEFLECTION YOKE ASSEMBLY FOR TELEVISION PICTURE

Kazunori Shizu, Tokyo, Japan, assignor to Kenki Onkyo Co., Ltd., Tokyo, Japan

Filed Feb. 12, 1969, Ser. No. 798,582
Claims priority, application Japan, Mar. 9, 1968, 43/18,237, 43/18,238
Int. Cl. H01f 7/00
U.S. Cl. 335—210 3 Claims

ABSTRACT OF THE DISCLOSURE

A deflection yoke assembly for a television picture tube includes a horn-shaped body of an insulating material constituting a bobbin for the horizontal and vertical deflection coils. At its lesser diameter head, the body has a radial flange carrying means supporting a pin cushion transformer electrically connected with the deflection coils. The arrangement is such that a unit is provided which requires only four male-female or plug-type connections to the remainder of the circuitry of the television set.

BACKGROUND OF THE INVENTION

The invention relates to a deflection yoke for a color television set, and more particularly to such yoke on which means to correct pincushion distortion is mounted.

It is well known that when deflection coils produce uniform magnetic fields, the raster in a television unit becomes appreciably distorted at larger angles of deflection, which distortion is commonly known as pincushion distortion. Conventional means to correct deflection distortions in television units comprise either compensation magnet or suitable shaping of the waveform of the deflection current which is passed through the deflection coils. However, the compensation magnet is not suitable for such correction purpose in a color television set, and it is the usual practice to provide a circuit which effects the modulation of vertical and horizontal deflection currents with the periods of horizontal and vertical scanning, respectively. In the prior art color television sets, such modulation circuit means is located on the chassis to keep it away from the deflection yoke through which a shadow mask tube extends, and the connection with the vertical and horizontal deflection coils mounted on the yoke is completed by lead wires having a plug attached at their one end. However, such arrangement requires substantial space on the chassis and mounting means for the pincushion transformer, and further requires a plug and socket unit of special design because of the increased number of connections and high voltages involved. In addition, the mounting and connection are time-consuming and troublesome; the plug causes contact fault; the connection wire may be broken; and the elongated wires for interconnection have undesirable magnetic influences upon the adjacent components.

Therefore, it is an object of the invention to avoid above disadvantages.

Another object is to provide a deflection yoke for a color television set which is provided thereon with circuit means to correct pincushion distortion.

According to the invention, there is provided a deflection yoke on which are mounted vertical and horizontal deflection coils, the yoke comprising a horn-shaped frame body of an insulating material which constitutes the bobbin for the coils, the body having at its end of lesser diameter a radially extending flange or like member which carries means supporting a pincushion transformer, the transformer being electrically connected with both deflection coils.

Figure 1:
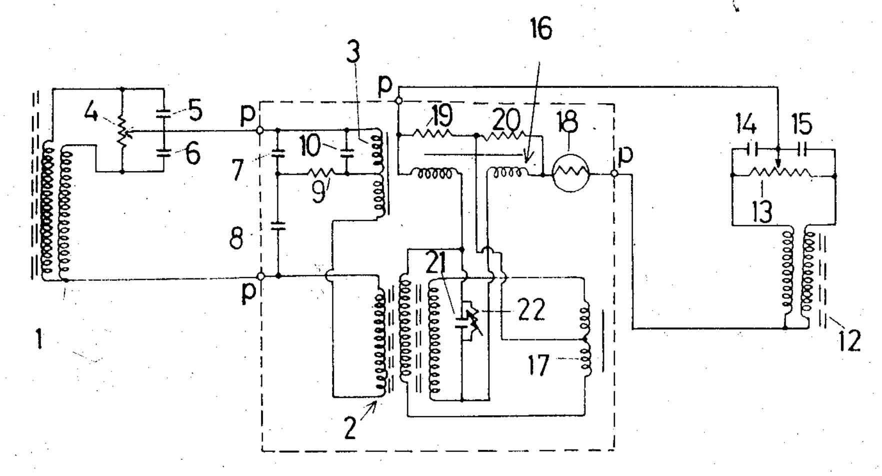
Figure 2:
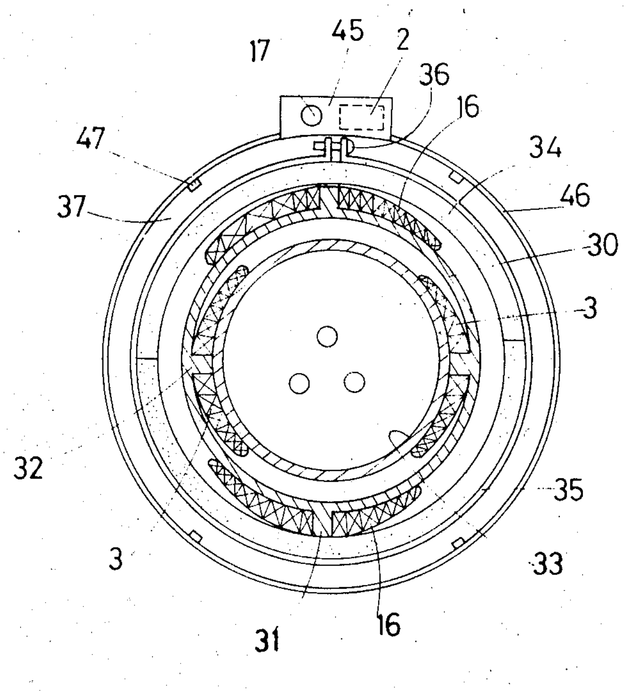
Figure 3:
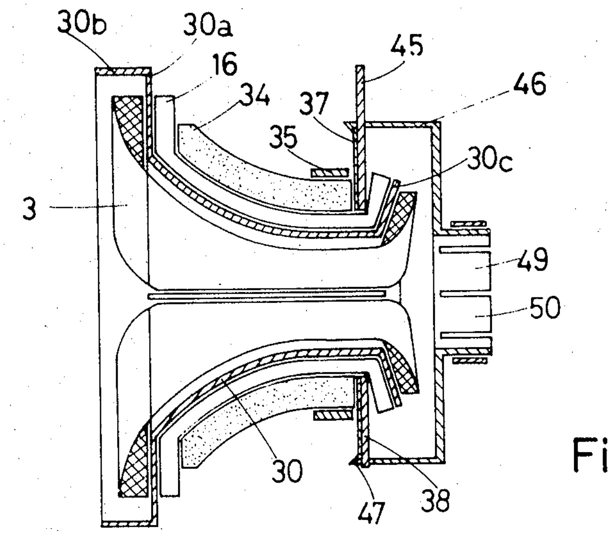
Figure 3A:
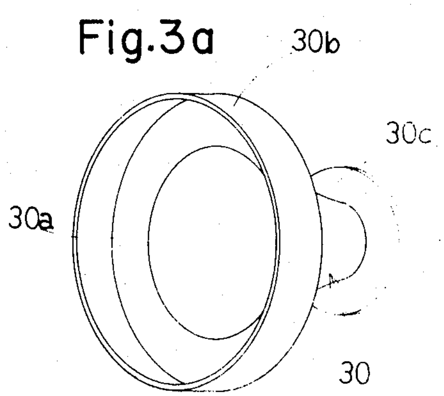
Figure 3B:
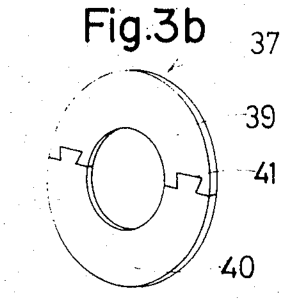
Figure 3C:
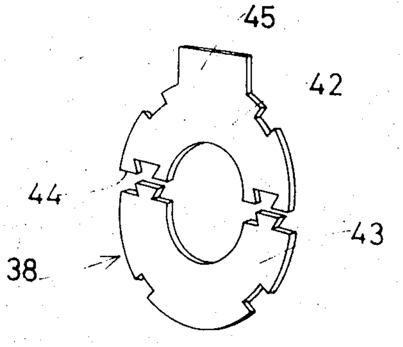
Figure 3D:
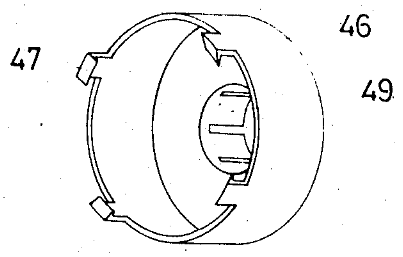
Figure 4:
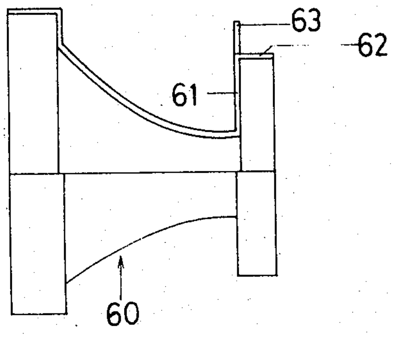
Figure 4A:
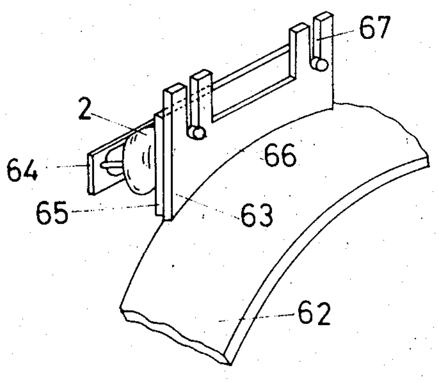
Figure 4B:
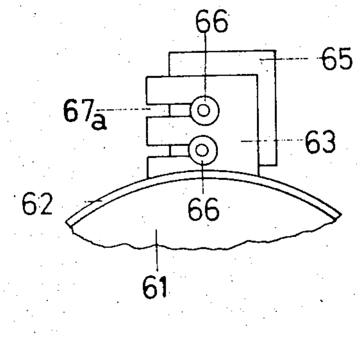
Figure 5:
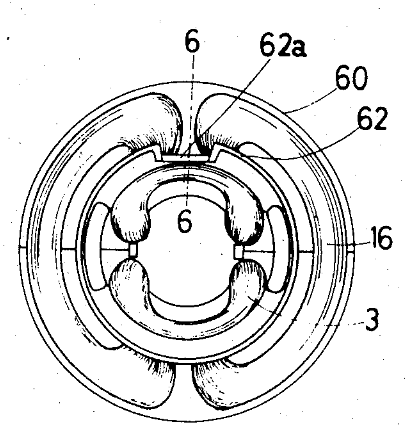
Figure 6:
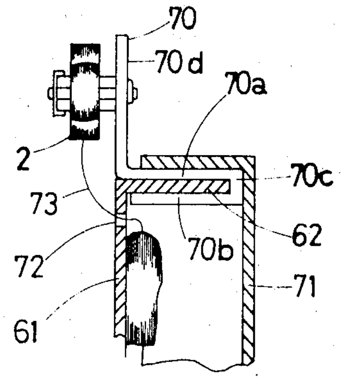
Figure 7:
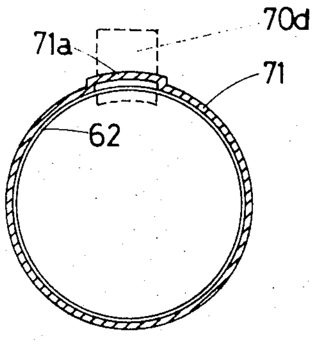

For a better understanding of the invention, it will be described more particularly with reference to the drawings in which FIG. 1 is a circuit diagram of the deflection circuit for a color television set, incorporating a pincushion transformer, FIG. 2 is a front view, partly in section, of a deflection yoke assembly, FIG. 3 is a fragmentary longitudinal section of a frame body in accordance with one embodiment of the invention, FIGS. 3*a* to 3*d* are exploded views of parts constituting the frame body shown in FIG. 3, FIG. 4 shows another form of the frame body, FIGS. 4*a* and 4*b* are perspective views showing manners in which the pincushion transformer is supported on the frame body of FIG. 4, FIG. 5 is a rear view of further embodiment of the invention, with pincushion distortion correction means being removed, FIG. 6 is a longitudinal section of part of the embodiment shown in FIG. 5 with the correction means mounted in place, and FIG. 7 shows a modification of FIG. 5.

Referring to FIG. 1, there is shown a circuit diagram of a conventional vertical and horizontal deflection circuit incorporating a pincushion transformer. It should be noted that the invention is not limited to any particular form of circuit arrangement and that the illustration is given merely to show the interconnection with deflection coils. The circuit includes a transformer 1 which provides a horizontal deflection output. The transformer is shown to comprise bifilar windings, which is known in the art. The common ends of the windings are connected, through a winding on a pincushion transformer 2, to one end of one of series connected horizontal deflection coils 3 forming a pair and which are arranged on opposite lateral sides of a cathode ray tube. Across the other ends of the bifilar windings is connected a circuit comprising a variable resistor 4 in parallel with a pair of capacitors 5, 6 connected in series, with the movable point on the variable resistor being connected with the junction between the capacitors. This provides adjustment of horizontal positioning of the raster on the screen. The movable point is connected with the other end of the coils 3, and across the movable point and the common ends of the transformer 1 is connected a pair of capacitors 7, 8. The junction between the capacitors 7, 8 is connected through a resistor 9 with the junction of the coils 3, which is in turn connected to the movable point through a capacitor 10. The circuit comprising parts 7, 8, 9 and 10 is known to provide amplitude adjustment of the raster. The deflection circuit also includes a transformer 12 which provides a vertical deflection output. The transformer 12 is also shown to comprise bifilar windings, of which separate ends are interconnected by a variable resistor 13 in parallel with a pair of capacitors 14, 15 to provide vertical positioning of the raster. The movable point on the resistor 13 is connected with the junction between the capacitor 14, 15 and is further connected, through one of vertical deflection coils 16, a second winding on the pincushion transformer 2, a phase adjustment coil 17, a third winding on the pincushion transformer 2, the other of the vertical deflection coils 16 and a thermistor 18, all in series, to the common ends of the bifilar windings of the vertical deflection output transformer 12. The pair of vertical deflection coils 16 is shunted by a pair of resistors 19, 20 connected in series, and the junction therebetween is connected with the center tap on the phase coil 17. The purpose of the phase coil 17 is to adjust the phase of a correction current that compensates for the pincushion distortion. A capacitor 21 and a resistor 22 are connected in parallel across the second and third windings on the pincushion transformer 2, and provide amplitude adjustment of the correction current. As is well known in the art, the thermistor 18 provides temperature compensation in that it compensates for the variation with temperature of the resistance of the deflection coils 16, which may cause variations of vertical amplitude and convergence properties.

In the prior art color television sets, the deflection yoke carried only components 3, 16, 18, 19 and 20, even though the capacitor 10 may be mounted on the deflection yoke. Therefore, it will be appreciated that there will be three connections for the horizontal deflection coils 3 and five connections for the vertical deflection coils 16. Because of high voltages, e.g. on the order of a few kilovolts, for the horizontal deflection, used in conjunction with substantially lower voltage, which may be a few hundred volts, for the vertical deflection, a multi-pin plug and socket unit of ordinary design cannot be used for the necessary connection and the usual practice heretofore has been to use a unit of special design or separate units for the respective groups of connections. However, according to the invention, the pincushion transformer 2 and associated components are mounted on a terminal board or other suitable support carried by the deflection yoke and are electrically connected with the deflection coils directly, as by soldering, so that the resulting yoke assembly includes a semi-complete circuit that is represented by a block shown in broken lines in FIG. 1. Thus the necessary number of external connections is four in all, as indicated by character "P" in FIG. 1.

The construction of the deflection yoke according to the invention which permits the reduction of external connection will be described below. Referring to FIGS. 2 and 3, the deflection yoke includes a horn-shaped frame body 30, of an insulating material, which is formed in two similar parts, which are bonded together. The body is formed with a pair of outwardly projecting ribs 31 and a pair of inwardly projecting ribs 32, the ribs of each pair being opposite diametrically and extending generally in the axial direction a certain length. The ribs 31 and 32 are spaced 90° angularly from each other. A pair of preformed horizontal deflection coils 3 are fitted around the ribs 32 so as to have an inner profile which is in conformity to the cylindrical or conical wall 33 of a color tube. A pair of preformed vertical deflection coils 16 are fitted on the outer surface of the body around the ribs 31, it being understood that the coils 3 an 16 are saddle-shaped. The deflection coils are surrounded by an annular ferrite core 34 which is made in two parts and which is clamped together around the coils by a ring 35, the ring 35 having its opposite ends joined together by suitable means such as a screw 36. The frame body 30 will be more clearly seen in FIG. 3, where the ribs 31, 32 are omitted for clarity. At the larger aperture end, the horn-shaped body 30 is formed with a radially extending flange 30*a* which is contiguous with an axially extending portion 30*b* which receives the front end of the horizontal deflection coil. From this end, the body 30 gradually decreases its diameter toward the opposite end, conforming to the shape of the cone part of the picture tube, and terminates in a tail portion 30*c* of sharply increasing diameter, on which the rear ends of the vertical deflection coils 16 are positioned. At the bend in the body 30, an insulating plate 37 and a terminal board 38 are fitted around the body 30.

Referring to FIGS 3*a* to 3*d*, the insulating plate 37 comprises a pair of upper and lower semi-circular members 39, 40, each having a rabbet joint 41. The inner peripheries of the members 39, 40 are shaped to fit, when assembled, closely around the rear portion of the vertical deflection coils 16 at the minimum diameter of the body 30. The terminal board 38 similarly comprises a pair of upper and lower semi-circular members 42, 43, each having a rabbet joint 44. The upper member 42 is integrally formed with an extension 45 which serves for mounting of the pincushion transformer (not shown) thereon. The inner periphery of the members 42, 43 is similarly dimensioned as that of the members 39, 40. In addition, there is provided a cover member 46 of generally cylindrical shape and having four hook-shaped tabs 47 which are equidistantly spaced apart along and axially projecting from one edge of its body. The cover member 46 is made from a suitable insulating material and is formed at its end remote from the tabs with a series of flaps 49 which define a passage 50 for allowing the neck part of the bulk to extend therethrough. In the example shown, the cover member 46 has substantially same diameter as the terminal board 38 when assembled, and the insulating plate 37 has a reduced diameter.

In assembly, the deflection coils 3, 16 are mounted and held in place, together with core 34, on the bobbin or the body 30, and then the members 39, 42 and members 40, 43 are fitted from above and from below, respectively, around the rear portion of the vertical deflection coils 16 at the bend in the body 30. The members 39, 40 and the members 42, 43 are interengaged at the joints 41 and 44, respectively. Suitable adhesive (shown by black lines) is filled in the space between the plates 37, 38 on one hand and the rear ends of the core 34 and the coil 16 on the other. The adhesive is allowed to set while maintaining the members 37, 38 vertically or at right angles to the axis of the body 30.

It will be appreciated that lead wires from the deflection coils 3, 16 can be let through suitable openings (not shown) in the plate 37 and the board 38, and lead wires from the pincushion transformer 2 and the phase coil 17, mounted on the extension 45, can similarly be passed through suitable notches or openings so that before engaging the cover member 46, all of necessary electrical connections within the block indicated in broken lines in FIG. 1 can be made on the terminal board 38, it being understood that the components 7 to 10 and 18 to 22 are supported on the terminal board 38 or the extension 45 as required. The mounting and arrangement of such components will be within the skill of the arts. If desired, the insulating plate 37 may be omitted, but it is preferable to provide it since it serves as a cover for conductive lugs or strips which may extend through the board 38 to the front side thereof and thus remain exposed. Finally, the cover member 46 is engaged with the board 38, the tabs 47 keeping the cover member in place by snap engagement with the board. The flaps 49 surround the bulb neck and are clamped by suitable means.

Referring to FIG. 4, it will be noted that the frame body 60 shown in this figure differs from that shown in FIG. 3 in the rear end thereof, where the tail portion 30*c* of FIG. 3 is replaced by a radial flange 61 which has along its radially outer end an axial extension which forms a short sleeve 62. The radial flange 61 is integrally formed with or has secured thereto an extension 63 which lies in the plane of the flange 61 on top thereof. The rear surface of the radial flange 61 internally of the sleeve 62 serves as a terminal board where circuit components and terminals can be carried and electrically interconnected. Such components and electrical connection can be protected by a cover member, similar to that shown at 46 in FIG. 3*d*, which engages the sleeve 62. A manner in which the pincushion transformer 2 and phase coil 17 are mounted on the extension 63 is illustrated in FIG. 4*a*, where the transformer 2 and the coil are supported between a pair of plates 64, 65 and the plate 65 is provided with two bolts 66 at its back, the bolts engaging a pair of vertical slits 67 formed in the extension 63. Such slits may extend horizontally, as shown at 67*a* in FIG. 4*b*. Alternatively, the slits may be inclined with respect to both the vertical or horizontal, or the slits may be replaced by through-holes which permit bolts or screws to secure the parts. Furthermore, a ledge may be provided on the flange 61 or the extension 63 on the side away from the sleeve 62 so as to allow the use of a bracket for supporting the pincushion transformer 2. Obviously, the transformer 2 may be mounted on the extension in any other suitable manner.

Referring to FIGS. 5 to 7, there is shown a further embodiment of the deflection yoke according to the invention. The yoke comprises a frame body which is the same as the one shown in FIG. 4 except that the body used in this embodiment does not have the extension 63 shown in FIG. 4. FIG. 5 is a rear view of the body on which deflection coils 3, 16 are mounted. It will be noted that a part of the sleeve 62 is depressed inwardly, as indicated at 62*a*. FIG. 6 is a longitudinal section along the lines 6—6 shown in FIG. 5. In FIG. 6, a channel-shaped member 70 engages the sleeve 62 at the depressed part 62*a*, from its rear end. To this end, the member 70 has a pair of horzontal limbs 70*a*, 70*b* interconnected by a short bend 70*c* and also has an upright wall portion 70*d*, which provides a support for the pincushion transformer 2. It will be appreciated that the dimensions of the parts 70*a*, 70*b* and 70*c* are chosen so that they fit closely on the sleeve 62. A cylindrical cover member 71 is adapted to engage the member 70 all around the sleeve 62, with the limb 70*a* of the member 70 being received in the depression 62*a*. The cover member 71 may be a tight fit on the sleeve 62, or may be held in place by any suitable means. Instead of providing the depression 62*a*, a part of the cover member may be increased in diameter, as indicated at 71*a* in FIG. 7, so that the limb 70*a* can be held sandwiched between the part 71*a* and the sleeve 62 having a complete circular section. It will be understood that the inner surface of the radial flange 61 of the frame body provides a mounting area for the components which are to be electrically connected with the pincushion transformer and deflection coils. An opening 72 is formed in the flange 61 to allow lead wires 73 from the pincushion transformer 2 to pass therethrough to be connected with the end of a deflection coil, partly shown, but such lead wires may extend to suitable conductive lugs or terminals (not shown) which may be provided on the inner surface of the flange 61 for the purpose of interconnection. Similar openings can be formed in the flange 61 for extending lead wires from the deflection coils to the mounting area.

It will be appreciated that the required connection can be completed with lead wires of substantially reduced lengths and that the number of the external plug connection is reduced to four by virtue of interconnection within the deflection yoke assembly. A plug and socket connection of such reduced number can be readily made with commercially available units. It is found that the provision of the pincushion transformer on the deflection yoke has only negligible influences upon the deflection characteristics for all practical purposes. Thus there is no need to provide an electromagnetic shield for the transformer 2.

Having described the invention, what is claimed is:

1. A deflection yoke with horizontal and vertical deflection coils mounted thereon, said yoke comprising a horn-shaped frame body of an insulation material and which constitutes the bobbin for said coils, said body having, at its end of lesser diameter, a radially extending flange which carries means supporting a pincushion transformer, said transformer being electrically connected with both said deflection coils, an insulating plate member being secured to the body at said end to extend in a plane perpendicular to the axis of the body, said plate member carrying the pincushion transformer which has its windings electrically connected with the horizontal and vertical coils through terminals provided on said plate member.

2. A deflection yoke with horizontal and vertical deflection coils mounted thereon, said yoke comprising a horn-shaped frame body of an insulating material and which constitutes the bobbin for said coils, said body having, at its end of lesser diameter, a radially extending flange which carries means supporting a pincushion transformer, said transformer being electrically connected with both said deflection coils, said body having an integral radial flange at said end of lesser diameter, said flange being formed with openings through which bolts extend, the bolts being secured to a support which carries the pincushion transformer.

3. A deflection yoke with horizontal and vertical deflection coils mounted thereon, said yoke comprising a horn-shaped frame body of an insulating material and which constitutes the bobbin for said coils, said body having, at its end of lesser diameter, a radially extending flange which carries means supporting a pincushion transformer, said transformer being electrically connected with both said deflection coils, a radial flange extending from said end of lesser diameter as an integral part of said body, the outer end of said flange being continuous with an integral, axially extending sleeve which is aligned with the axis of said body, said sleeve extending in a direction away from said body, a channel-shaped member of an insulating material having a pair of interconnected legs and a part extending substantially at right angles to the length of said legs, said legs being spaced apart over their whole length a distance corresponding to the thickness of said sleeve, whereby said legs can be closely fitted around said sleeve and said part extends radially outwardly from said sleeve, and a cover member engaging said sleeve to thereby hold said channel-shaped member in place.

References Cited

UNITED STATES PATENTS 2,813,212 11/1957 Grudmann .......... 335—210X
3,191,105 6/1965 Robinson .......... 335—212

FOREIGN PATENTS 1,358,834 3/1964 France .......... 335—210

GEORGE HARRIS, Primary Examiner

U.S. Cl. X.R.

335—212